United States Patent [19]
Vargo

[11] 3,959,607
[45] May 25, 1976

[54] COMMUNICATIONS BOOTH WITH AUTOMATIC ACCOUNTING FOR TELEPHONE AND BOOTH USAGE

[75] Inventor: John H. Vargo, Verplanck, N.Y.

[73] Assignee: Christopher Anthony Vargo, Verplanck, N.Y.

[22] Filed: Feb. 12, 1975

[21] Appl. No.: 549,223

Related U.S. Application Data

[63] Continuation-in-part of Ser. No. 309,396, Nov. 24, 1972, abandoned.

[52] U.S. Cl. .......................... 179/183; 179/6.3 CC; 340/149 A
[51] Int. Cl.² ........................................ H04M 15/00
[58] Field of Search .......... 179/183, 6.3 R, 6.3 CC; 340/149 A, 149 R, 147 R; 317/134; 235/61.7 B

[56] References Cited
UNITED STATES PATENTS

| | | | |
|---|---|---|---|
| 3,022,381 | 2/1962 | Pferd .................................. | 179/6.4 |
| 3,111,720 | 11/1963 | Sherron ............................... | 20/3.5 |
| 3,624,608 | 11/1971 | Altman et al. .................... | 340/149 A |
| 3,659,154 | 4/1972 | Finn ................................... | 317/134 |
| 3,665,397 | 5/1972 | Napoli et al. .................... | 340/147 R |
| 3,742,453 | 6/1973 | Poylo ................................ | 340/149 A |
| 3,752,904 | 8/1973 | Waterbury ........................ | 178/5.1 |
| 3,838,395 | 9/1974 | Suttill, Jr. et al. .............. | 340/149 A |

Primary Examiner—Thomas W. Brown
Attorney, Agent, or Firm—Allison C. Collard

[57] ABSTRACT

A climate-controlled communications-work booth for use as a local office by travelling salesmen, businessmen and the like. The booth is provided with a molded contoured chair, and a work table therein on which a telephone is disposed. Access to and exit from the booth is controlled by an electronic credit card-operated lock system, controlled by a computer, which automatically opens the booth door to permit the user to enter. The booth is preferably constructed of ferrocement, and has the climate control and electrical equipment encased in detachable modules. When a user leaves the booth and closes the door, the computer measures the time of use in the booth and the amount of telephone calls made therein and renders the user a monthly bill charged to his credit card.

6 Claims, 5 Drawing Figures

COMMUNICATIONS BOOTH WITH AUTOMATIC ACCOUNTING FOR TELEPHONE AND BOOTH USAGE

This is a continuation-in-part of application Ser. No. 309,396, filed Nov. 24, 1972, now abandoned.

The present invention relates to an improved telephone booth, and in particular, to a card-operated, climate-controlled, oversized communications booth for travelling businessmen, salesmen and the like.

Telephone booths presently available are generally uncomfortable and unsuitable for use as a temporary local office by travelling salesmen or businessmen who wish to contact local or remotely located clients on a business trip. They are frequently out of order, and damaged by vandalism. Such booths are also often located on street corners or in busy train stations and airports, and are thus noisy, and sometimes are not provided with doors or a full enclosure. The excesive noise generated in busy areas interferes with telephone calls made in the booth, and prevents the businessman from using the booth in comfort. But above all, the necessity of having sufficient change to place a large number of telephone calls from such a booth or give a verbal credit card number is of particular annoyance to a travelling salesman or businessman.

Accordingly, the present invention provides a climate controlled, oversized communications booth whose access is controlled by a card-operated, computer-controlled, lock system, which is relatively vandal-proof, and which is constructed especially for the comfort of travelling businessmen and salesmen while working or making telephone calls. The communications booth of the present invention is oversized, as compared to present telephone booths, and is provided with a comfortable contoured chair, and a desk area. The communications booth may, thus, be used either as a temporary office for the travelling salesman who does not wish to make calls, or as a local and long distance communications center for the salesman who does. Access to the work booth is controlled by a card-operated, computer-controlled lock, which is responsive to magnetic characters imprinted on the card. The card is read by a computer, coupled to the work booth by telephone lines, located at a remote location, which records the data on the card — such as the user, identification data —, and the time the card is inserted in the lock, the location of the booth, etc. If the computer determines that the user is entitled to access, it activates the door lock to release the sliding door to allow entrance of the user into the booth, and activates a telephone, light and climate control equipment for heating and air conditioning. Upon completion of his work, the user opens the door and leaves the booth. This automatically notifies a mat or seat sensor, which signals the computer to terminate the user's billing time. At the end of a specified billing period, the user will receive a bill for his use of the booth and any telephone calls placed therein.

The booth is preferably constructed of ferrocement, and has a sliding transparent door. The climate control equipment is encased in a detachable module, also constructed of ferrocement, which forms the roof of the work booth. Power supply lines, the telephone lines and the computer tie lines are coupled to the lighting and climate control units, the telephone, and the door lock by an interface module located within the work booth. The ferrocement construction of the booth, and the controlled access to the booth, render the communications booth of the present invention relatively safe from damage by vandals.

It is therefore an object of the present invention to provide a controlled access communications booth which may be used as a local office by travelling businessmen and salesmen.

It is another object of the present invention to provide a communications booth for travelling businessmen, salesmen and the like, which provides comfortable accomodations for the user while he is working or making telephone calls, and which is relatively safe from damage by vandals.

It is still a further object of the present invention to provide a communications booth which is simple in design, easy to manufacture, and efficient and reliable in operation.

Other objects and features of the present invention will become apparent from the following detailed description when considered in connection with the accompanying drawings which disclose illustrative embodiments of the invention. It is to be understood that the drawings are designed for the purpose of illustration only, and are not intended as a definition of the limits and scope of the invention.

In the drawings, wherein similar reference numerals denote similar elements throughout the several views.

Figure 1:
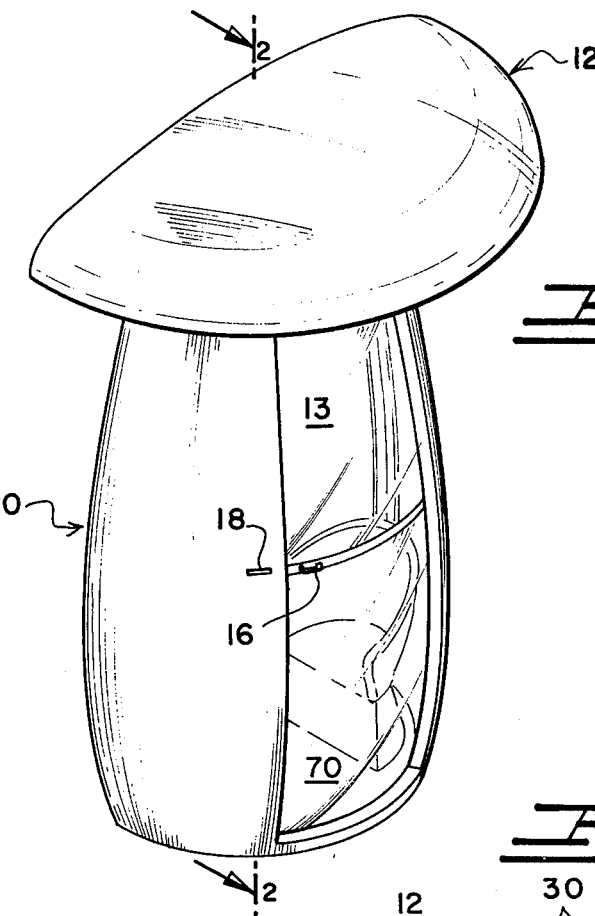
FIG. 1 is a perspective view of a communications booth constructed in accordance with the present invention.

Referring now to the drawings, there is shown a communications booth 10 having a generally truncated, semi-oval shape, comprising a frame 11, a roof 12, a curved, sliding door 13, and a floor 14 which may be ferrocement, steel, or a combination of both. Door 13 is slidably mounted on ball bearings in curved tracks 15 mounted at the top and bottom of the door opening in booth 10. The door is constructed of transparent unbreakable material, such as, for example, Plexiglass 70, or Lexan. Handle 16 is attached to the outside of door 13 for sliding the door adjacent the opening in the booth to permit access by a user. An electronic door lock 17 is mounted in booth 10 adjacent door 13 for latching and unlatching the door to control access to and exit from the booth. Slot 18 is provided in lock 17 for receiving an identification card which acts as a "key" to the booth.

Figure 2:
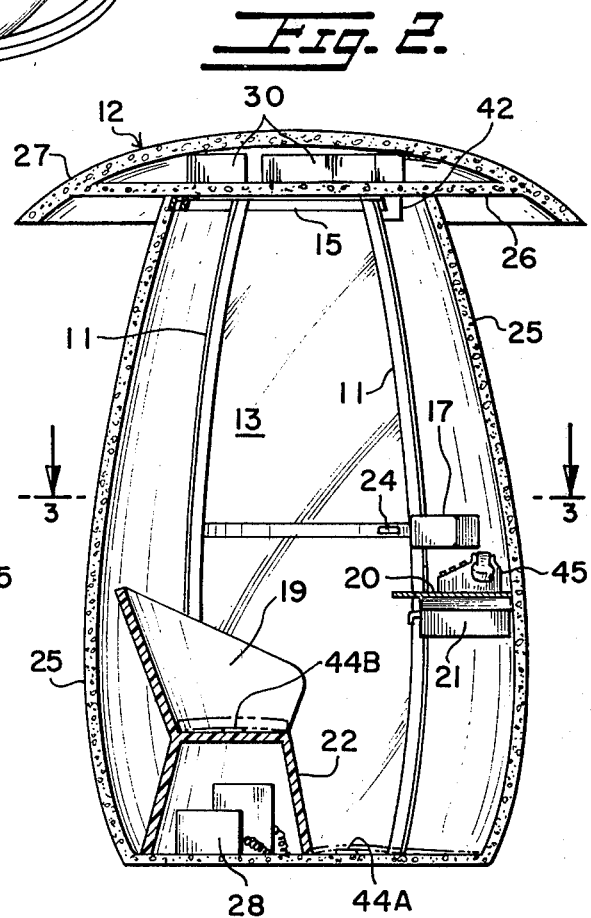
FIG. 2 is a cross-sectional side view of the booth, taken along section 2—2 of FIG. 1.
Figure 3:
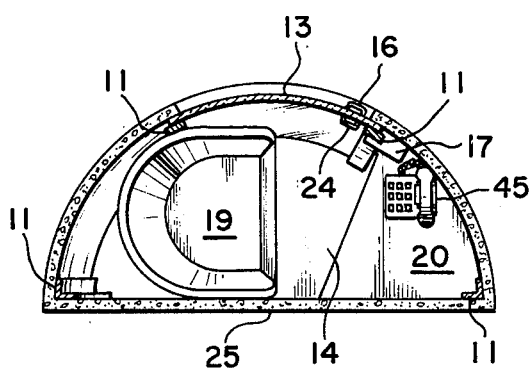
FIG. 3 is a top, cross-sectional view of the booth, taken along section 3—3 of FIG. 2.

FIGS. 2 and 3 illustrate the interior of booth 10 in detail. A modular, contoured seat 19 is disposed in booth 10 in front of a work table 20, which has a slidable drawer 21. Base 22 of seat 19 houses a detachable module containing electrical interface equipment for booth 10. A standard, C-type telephone set 45 is disposed on work table 20, which is coupled to the outside telephone system via the computer, for the placing of telephone calls from booth 10. Handle 24 is provided on the inside of door 13 for opening the door from the inside of the booth. Booth walls 25 are comprised of ferrocement, or fiberglass, disposed over frame 11.

Roof 12 comprises a support frame 26, has a generally truncated, semi-spherical shape, and has walls 27 constructed of ferrocement disposed on frame 26, which may be metal or ferrocement. Roof 12 is a detachable module, removable from booth 10, which houses a climate-control system, including an air conditioning unit and heating unit 30, and a thermostat and the lighting system of booth 10. The roof module is electrically coupled to the interface equipment disposed in base 22 of seat 19 by electrical cables (not shown) disposed in booth walls 25 which terminate in electrical connectors at roof 12 and seat base 22.

Electronic card lock 17, the power supply system for the lighting, the climate-control system, and telephone set 23 are coupled by the interface equipment to a remote computer system which is programmed to operate the booth. The computer system permits the climate-control system, lights, telephone lines, and door lock to be activated, to permit access to the booth and operation of the telephone, only when a valid identification card is presented, and only if the credit rating of the user of the card is acceptable. Telephone set 45 is coupled through the interface equipment to the computer. This computer records all calls and switches this information to the local telephone company. Each booth will have its own code number and at the end of the month, the local telephone company will provide a computer tape bill of all booths. This tape will indicate each of the communication booths and all of the calls which are made by the user in connection with his credit card so that the user can be billed periodically, such as, for example, at monthly intervals.

Electronic lock 17 may be any suitable type which will provide the function described, such as, for example, the card-operated lock manufactured by Card Key Systems, of Chatsworth, Calif., or IBM Corporation, of Armonk, N.Y. The card used to open electronic lock 17 has a magnetic code imprinted thereon which identifies the user.

The climate-control system encased in roof 12 generally comprises a thermostat, an air conditioning unit, and a heating unit, which circulate cool or hot air through the booth and maintain a comfortable temperature therein, which is suitable for work by a businessman. The specific climate-control system chosen may be any suitable type which provides the function desired.

Seat 19 is an integral unit, consisting of a single molded work piece. Base 22 of the seat is hollow, and houses electrical interface equipment 28. Base 22 of the seat is secured to floor 14 of the booth, by suitable detachable fastening means, such as steel bolts. The vital power and communication lines to the booth, are, thus, protected from damage by vandals gaining unauthorized access to the booth. Seat 19 is constructed of any suitable maintenance-free, sturdy material, such as polypropylene or fiberglass.

In order to provide sufficient room for permitting the businessman or salesman to work in the booth for considerable time, the booth is constructed of a size which generally provides twice the interior space of a conventional telephone booth. This provides the salesman or businessman with sufficient room to operate from his briefcase in the booth, and write orders, arrange appointments, etc., comfortably. It should be noted that the size suggested for the work booth is generally a guide, and the particular construction for a specified application or installation may be varied to suit requirements.

Figure 4:
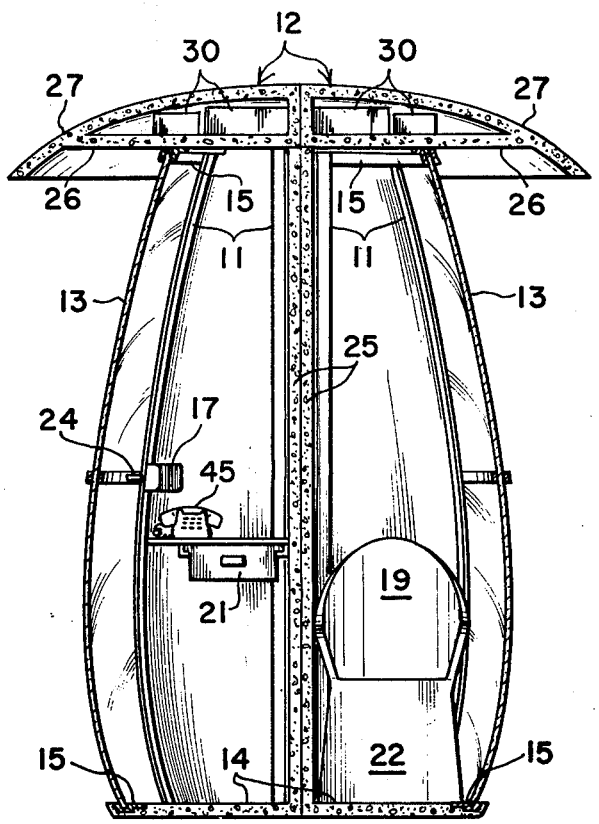
FIG. 4 is a cross-sectional view of a pair of booths constructed in accordance with the present invention, disposed in a back to back arrangment.

The work booth described herein may be located in single units at desired locations, or, as illustrated in FIG. 4, may be disposed in multiple units in a back to back arrangement. Such an arrangement permits maximum utilization of space in positioning work booths in a particular area, while still maintaining the privacy and distractionfree atmosphere necessary for work in the booth.

Figure 5:
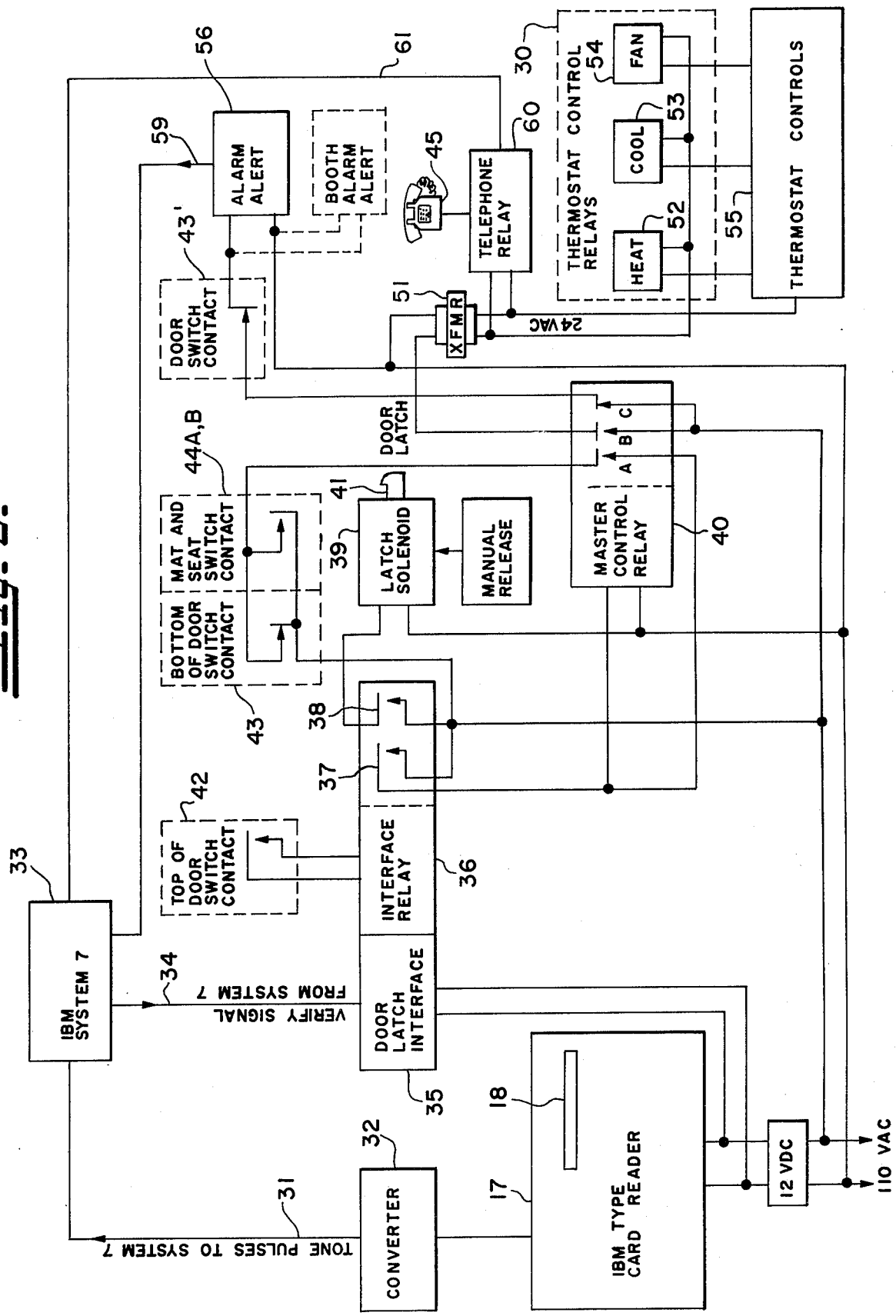
FIG. 5 is a block diagram of the control system for the booth of the present invention.

FIG. 5 illustrates schematically the electrical control system for the workbooth of the present invention. When the identification card is inserted in the slot 18, card reader 17 initiates the reading of the magnetic code on the card. Card reader 17 is disposed in the booth adjacent insertion slot 18, sends the coded information to a converter 32, which is disposed in the base of seat 22. The converter changes the magnetic bits of information to tone pulses which are sent via telephone lines 31 to an IBM System 7 computer 33 or the like.

Computer 33 compares the information received from the card with its memory information and determines if the user is entitled to entry. In the event the user is entitled to entrance and the card is valid, a verifying pulse from computer 33 is returned via lines 34 to a latch interface 35 which activates an interface relay 36. The relay 36 has contacts 37 and 38 and the relay contacts 37 and 38 complete the circuit to a latch solenoid 39 as well as to the master control relay 40 by closing of the relay contacts 37 and 38. The actuation of the latch solenoid 39 releases door latch 41 releasing the door for manual opening. A normally open door switch contact 42 is provided connected to interface relay 36. Switch contact 42 is mounted near the top of the door, and its contacts close when the door is closed. When door switch contact 42 is transferred to the closed condition when the door is closed, it holds the latch solenoid activated until the door is opening approximately six inches. Switch contact 42 then opens, breaking the circuit to interface relay 36, to deactivate latch solenoid 39. Accordingly, door switch 42 is normaly opened at all times when the door is open greater than six inches, and is transferred to the closed position when the door is closed, holding the latch solenoid activated until the door is opened six inches. In this way, while the user is in the phone booth, and the latch solenoid remains activated, the user can easily open the door to leave when he desires. After the door is opened more than six inches, it is not necessary to keep the latch solenoid opened.

A master control relay 40 establishes its own hold circuit through contact 40a, door switch contact 43 and/or mat seat contact 44 in parallel. Master control relay contact 40b then completes a circuit to a thermostat transformer 51 and a telephone relay 60. The heat, cool and fan relays 52, 53 and 54 are now operable under the normal control of the thermostat 55 connected to heater and air conditioner 30.

A telephone relay 60 connected to transformer 51 will control both the communicating and ringing circuits and connect a telephone 45 through line 61 to computer 33.

The operation of the booth is now under the control of the user. Opening the door will not deactivate the booth as long as the user remains in the booth and his feet are on the mat 44A or he is sitting on the seat 44B.

Exit by the user will necessitate the manual depression of the door latch 39, opening of the door and stepping outside. Mat/seat contact 44 will now open. Closing the door from the outside will open door contact switch 43 which opens the hold circuit to the master control relay 40. When relay 40 drops, the telephone relay 60 and the thermostat relay transformer 51 are deactivated returning the booth to standby condition. Latch 41 will lock the door against further entry.

A vandalism interlock circuit is also provided now established to the alarm alert 56 through master control relay contact 40c and door contact switch 43'. Door contact switch 43' is opened with the door closed. If forcible entry is attempted by opening the door an inch or so, the alarm alert 56 will send a suitable coded signal to computer 33 through line 59 which will notify a central surveillance center furnishing the location of the booth being vandalized. Suitable action can then be taken by surveillance personnel. An additional alarm connected to alarm alert 56 may be sounded in the booth if desired.

When master control relay 40 deactivates telephone relay 60 and returns the booth to a standby condition, computer 33 terminates the user's billing time and computes a bill to the user based on the rates for the use of the telephone and the rental time of the booth.

While only a few embodiments of the present invention have been shown and described, it will be obvious to those of ordinary skill in the art that many changes and modifications may be made thereunto without departing from the spirit and scope of the invention.

What is claimed is:

1. A telephone communications booth for travelling salesmen, businessmen and the like which is responsive to a planar card having magnetic data disposed thereon comprising:
    a housing having a floor, a roof structure and walls;
    a door mounted to said housing for providing access to the booth;
    a card reader responsive to the planar card having the magnetic data disposed for reading the magnetic data and providing an output signal in response to the code on the planar card, said card reader having a card input opening adjacent to said door and external to said housing;
    a remote computer system coupled to said card reader for receiving the coded data contained on said card and for providing an output signal responsive to that code and information in said computer, including a billing charge for time usage of said booth as well as for telephone calls;
    latch means coupled to the output of said computer system and locking said door, said latch means releasing said door in response to the output signal from said computer system; said latch means comprises master control means, and a first door switch responsive to said door and coupled to said master control means so that the opening of said door energizes said master control means;
    a telephone control connected to said computer system and responsive to said latch means for connecting the telephone to a central switchboard; and switch means disposed within said booth and connected electrically parallel to said first door switch for sensing the presence of the user, said switch means being coupled to said master control means for keeping said master control means energized when said door is closed, said switch means being automatically responsive via said telephone control to establish a start of the billing charge for time usage in the booth when the user steps in the booth as well as to terminate the billing charge when the user steps out of said booth.

2. The booth as recited in claim 1 comprising temperature control means disposed in said roof structure and connected to said master control means for controlling the temperature of the interior of the booth, said temperature control means comprising a heating unit and an air conditioning unit.

3. The telephone booth as recited in claim 1 comprising a second door switch responsive to the opening of said door, an alarm circuit connected to said switch so that when said master control means is deenergized and said door is opened, said second door switch directly connects said alarm circuit to an external power source.

4. The telephone booth as recited in claim 3 wherein said alarm circuit is connected to said computer system so that the computer system provides an indication if the booth has been opened without authorization.

5. The telephone booth as recited in claim 3 wherein said alarm circuit includes a booth alarm disposed on said booth for sounding an audible alarm signal.

6. A method of telephone communication using a planar card having magnetic data thereon for access to a communications booth comprising the steps of:
    inserting the planar card into a card reader mounted external to the booth;
    activating a computer system in response to the magnetic data on the card;
    opening the booth in response to a signal from a computer in the computer system; the step of opening comprising activating the door latch to unlock the door of the booth in response to a signal from said computer;
    activating a telephone in the booth and connecting the telephone through the computer system to a central switchboard;
    measuring with the computer system via telephone connection the time interval that the booth is occupied by the user as well as the total toll calls made on the telephone;
    establishing via the telephone connection the start of the user's billing time charge for the rental of the booth and then automatically terminating the billing time as well as the telephone service and measured time interval when the user leaves the booth and closes the door; and
    issuing a billing charge and statement to the user for the booth rental time as well as the toll calls.

\* \* \* \* \*